(12) United States Patent
Crespo et al.

(10) Patent No.: US 6,397,179 B2
(45) Date of Patent: *May 28, 2002

(54) SEARCH OPTIMIZATION SYSTEM AND METHOD FOR CONTINUOUS SPEECH RECOGNITION

(75) Inventors: Jean-Francois Crespo, Laval; Peter R. Stubley; Serge Robillard, both of Lachine, all of (CA)

(73) Assignee: Nortel Networks Limited, Quebec (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,529

(22) Filed: Nov. 4, 1998

(51) Int. Cl.$^7$ .......................... G10L 15/08; G10L 15/18

(52) U.S. Cl. ........................... 704/242; 704/257

(58) Field of Search ................................. 704/231, 239, 704/240, 243, 251, 252, 242, 257

(56) References Cited

U.S. PATENT DOCUMENTS

| | | | |
|---|---|---|---|
| 5,345,537 A | * 9/1994 | Tanaka | 704/255 |
| 5,388,183 A | * 2/1995 | Lynch | 704/242 |
| 5,621,859 A | 4/1997 | Schwartz et al. | |
| 5,797,123 A | * 8/1998 | Chou et al. | 704/243 |
| 5,799,276 A | * 8/1998 | Komissarchik et al. | 704/251 |
| 5,819,220 A | * 10/1998 | Sarukki et al. | 704/270 |
| 6,016,470 A | * 1/2000 | Shu | 704/244 |

FOREIGN PATENT DOCUMENTS

| | | | |
|---|---|---|---|
| JP | 08123471 | 5/1996 | |
| JP | 08-123471 | * 5/1996 | G10L/17/27 |

OTHER PUBLICATIONS

Tran et al ("A Word Graph Based N–Best Search in Continuous Speech Recognition," International Conference on Spoken Language Proceedings, Oct. 1996).*
Gupta et al ("Automation of Locality Recognition in ADAS Plus," Interactive Voice Technology for Telecommunications Applications Proceedings, Jun., 1998).*
European Search Report, Dec. 19, 2000.
Hy Murveit et al. "Integrating Natural Language Constraints into HMM–based Speech Recognition", International Conference on Acoustics, Speech & Signal Processing. ICASSP, US, New York, IEEE, vol. Conf. 15, Apr. 3, 1990, pp. 573–576, XP000146533;.
Nagai A. et al.: "Semantic Interpretation Based on Detecting Concepts for Spontaneous Speech Understanding", International Conference on Spoken Language Processing, (ICSLP), JP, Yokohama: ASJ, Sep. 18, 1994, pp. 95–98, XP000855195, abstract.

* cited by examiner

*Primary Examiner*—Richemond Dorvil
*Assistant Examiner*—Daniel A. Nolan

(57) ABSTRACT

A system and method for continuous speech recognition (CSR) is optimized to reduce processing time for connected word grammars bounded by semantically null words. The savings, which reduce processing time both during the forward and the backward passes of the search, as well as during rescoring, are achieved by performing only the minimal amount of computation required to produce an exact N-best list of semantically meaningful words (N-best list of salient words). This departs from the standard Spoken Language System modeling which any notion of meaning is handled by the Natural Language Understanding (NLU) component. By expanding the task of the recognizer component from a simple acoustic match to allow semantic information to be fed to the recognizer, significant processing time savings are achieved, and make it possible to run an increased number of speech recognition channels in parallel for improved performance, which may enhance users perception of value and quality of service.

9 Claims, 7 Drawing Sheets

SEARCH OPTIMIZATION SYSTEM AND METHOD FOR CONTINUOUS SPEECH RECOGNITION

RELATED APPLICATIONS

This application is related to U.S. patent application Ser. No. 08/997,824 to Stubley et al. entitled "Order of matching observations to state models", filed Dec. 24, 1997; U.S. patent application Ser. No. 09/118,621 to Stubley et al. entitled "Block algorithm for pattern recognition", filed Jul. 21 1998; and U.S. patent application Ser. No. 08/934736 to Robillard et al. entitled "Search and rescoring method for a speech recognition system", filed Sep. 22, 1997, which are incorporated herein by reference.

FIELD OF THE INVENTION

This invention relates to a system and method for optimization of searching for continuous speech recognition.

BACKGROUND OF THE INVENTION

Speech recognition for applications such as automated directory enquiry assistance and control of operation based on speech input requires a real time response. Spoken input must be recognized within about half a second of the end of the spoken input to simulate the response of a human operator and avoid a perception of unnatural delay.

Processing of speech input falls into five main steps: audio channel adaptation, feature extraction, word end point detection, speech recognition, and accept/reject decision logic. Pattern recognition generally, and more particularly recognition of patterns in continuous signals such as speech signals, requires complex calculations and is dependent on providing sufficient processing power to meet the computational load. Thus the speech recognition step is the most computationally intensive step of the process The computational load is dependent on the number of words or other elements of speech, which are modeled and held in a dictionary, for comparison to the spoken input (i.e. the size of vocabulary of the system); the complexity of the models in the dictionary; how the speech input is processed into a representation ready for comparison to the models; and the algorithm used for carrying out the comparison process. Numerous attempts have been made to improve the trade off between computational load, accuracy of recognition and speed of recognition.

Examples are described, e.g., in U.S. Pat. No. 5, 390,278 to Gupta et al., and U.S. Pat. No. 5,515,475 to Gupta et al. Many other background references are included in the above referenced copending applications.

In order to provide speech recognition which works efficiently in real time, two approaches are generally considered. The first is to make use of specialized hardware or parallel processing architectures. The second is to develop optimized search methods based on search algorithms that yield reasonable accuracy, but at a fraction of the cost of more optimal architectures. The latter approach is favored by many researchers, since it tackles the problem at the source, see for example, Schwartz, R., Nguyen, L., Makhoul, J., "Multiple-pass search strategies", in Automatic Speech and Speaker Recognition, Lee, C. H., Soong, F. K., Paliwal, K. K. (eds.), Kluwer Academic Publishers (1996), pp 429–456. This approach is appealing since the hardware and algorithmic optimizations are often orthogonal, so the latter can always be built on top of the former.

The basic components of a spoken language processing (SLP) system include a continuous speech recognizer (CSR) for receiving spoken input from the user and a Natural Language Understanding component (NLU), represented schematically in FIG. 1. A conventional system operates as follows. Speech input is received by the CSR, and a search is performed by the CSR using acoustic models that model speech sounds, and a language model or 'grammar' that describes how words may be connected together. The acoustic model is typically in the form of Hidden Markov Models (HMM) describing the acoustic space. The language knowledge is usually used for both the CSR component and the NLU component, as shown in FIG. 1, with information on grammar and/or statistical models being used by the CSR, and semantic information being used by the NLU. The structure of the language is often used to constrain the search space of the recognizer. If the goal is to recognize unconstrained speech, the language knowledge usually takes the form of a statistical language model (bigram or trigram). If the goal is to recognize a specific constrained vocabulary, then the language knowledge takes the form of a regular grammar.

The search passes the recognized word strings representing several likely choices, in the form of a graph, to the natural language understanding component for extracting meaning from the recognized word strings. The language model provides knowledge to the NLU relating to understanding of the recognized word strings. More particularly the semantic information from the language knowledge is fed exclusively to the NLU component with information on how to construct a meaning representation of the CSR's output. This involves, among other things, identifying which words are important to the meaning and which are not. The latter are referred to as non-keywords or semantically-null words. Thus semantically-meaningful words and semantically-null words are identified to provide understanding of the input, and in the process, the word strings are converted to a standard logical form. The logical form is passed to a discourse manager DM, which is the interface between the user and the application. The DM gathers the necessary information from the user to request the applications to perform the user's goal by prompting the user for input.

While the terms 'grammar' and 'language model' are often used interchangeably, in this application, a language model is defined as the graph that is used by the CSR search algorithm to perform recognition. A grammar is a set of rules, which may also be represented as a graph, used by the NLU component to extract meaning from the recognized speech. There may be a one to one mapping between the language model and the grammar in the case where the language model is a constrained model. Connected Word Recognition (CWR) is an example of the latter. Nevertheless, known spoken language systems described above separate language knowledge into grammar and semantic information, and feed the former to the CSR and feed the latter to the NLU.

Most search optimization techniques involve reducing computation by making use of local scores during the decoding of a speech utterance. Copending U.S. application Ser. No. 09/118,621 entitled "Block algorithm for pattern recognition", referenced above describes in detail an example of a search algorithm and scoring method.

For example, the Viterbi beam search, without a doubt the most widely used optimization, prunes the paths whose scores (likelihoods) are outside a beam determined by the best local score. Some neural-network based approaches threshold the posterior probabilities of each state to determine if it should remain active (Bourlard, H. Morgan, N., "Connectionist Speech Recognition-A Hybrid Approach", Kluwer Academic Press, 1994.)

Another important technique that helped reduce the computation burden was the use of lexical trees instead of dedicated acoustic networks as described by Ney, H., Aubert, X., "Dynamic Programming Search Strategies: From Digit Strings to Large Vocabulary Word Graphs", in Automatic Speech and Speaker Recognition, Lee, C. H., Soong, F. K., Paliwal, K. K. (eds.), Kluwer Academic Publishers (1996), pp 385–411. Along with that idea came language model look-ahead techniques to enhance the pruning described by Murveit, H., Monaco, P., Digalakis, V., Butzberger, J., "Techniques to Achieve an Accurate Real-Time Large-Vocabulary Speech Recognition System", in ARPA Workshop on Human Language Technology, pp 368–373.

While these techniques are undisputedly effective at solving these specific problems, in all cases, the sole sources of "language knowledge" used to reduce the search space are the language model and the grammar layout; semantic information is not used by the CSR.

Word spotting techniques are an attempt to indirectly use semantic information by focusing the recognizer on the list of keywords(or key phrases) that are semantically meaningful. Some word spotting techniques use background models of speech in an attempt to capture every word that is not in the word spotters dictionary, including semantically null words (non-keywords) (Rohlicek, J. R., Russel, W., Roukos, S., Gish, H., "Word Spotting", ICASSP 1989, pp 627–630).

While word spotting is generic, it is very costly and provides poor accuracy, especially when there is prior knowledge of which non-keywords are likely to be used. Because these latter models are so broad, they do not always efficiently model non-keywords which are likely to occur in an utterance (for example, hesitations, and polite formulations).

To overcome the low accuracy problems encountered in word spotting, Large Vocabulary Continuous Speech Recognizers, LVCSR, are used in the hope that any semantically null word will exist in the recognizers vocabulary (Weitraub, M., "LVCSR Log-Likelihood Ratio Scoring For Keyword Spotting", ICASSP 1995, Vol 1, pp 297–300). The output of the recognizer in this case is a string of keywords and non-keywords that is later processed by an NLU module to extract meaning. Language knowledge is separated into grammar and statistical information which are used by the CSR, and semantic information that is used by the NLU.

In all these approaches, the CSR recognizer simply outputs a string of keywords and non-keywords for further processing using semantic information: it does not make use of semantic information during the search. Consequently there is a need for further optimization of continuous speech recognizers.

SUMMARY OF THE INVENTION

Thus, the present invention seeks to provide a system and method for optimization of searching for continuous speech recognizers which overcomes or avoids the above mentioned problems.

Therefore, according to a first aspect of the present invention there is provided a method for continuous speech recognition comprising: incorporating semantic information during searching by a continuous speech recognizer.

Beneficially, incorporating semantic information during searching comprises searching using semantic information to identify semantically null words and thereby generate an N-best list of salient words, instead of an N-best list of both salient and semantically null words.

The savings, which reduce processing time both during the forward and the backward passes of the search, as well as during re-scoring, are achieved by performing only the minimal amount of computation required to produce an exact N-best list of semantically meaningful words (N-best list of salient words). This departs from the standard Spoken Language System modeling in which any notion of meaning is handled by the Natural Language Understanding (NLU) component. By expanding the task of the recognizer component from a simple acoustic match to allow semantic information to be fed to the recognizer, significant processing time savings are achieved. Thus, for example, it is possible to run an increased number of speech recognition channels in parallel for improved performance, which may enhance users' perception of value and quality of service.

According to another aspect of the present invention, there is provided a method for continuous speech recognition comprising: providing speech input to a continuous speech recognizer; providing to the continuous speech recognizer an acoustic model comprising a set of Hidden Markov Models, and a language model comprising both grammar and semantic information; performing recognition of speech input using semantic information to eliminate semantically null words from the N-best list of words and restrict searching to an N-best list of salient words; and performing word matching to output from the speech recognizer the N-best salient word sequences.

Advantageously, the step of performing recognition comprises: detecting connected word grammars bounded by semantically null words; collapsing each list of semantically null words into a unique single-input single-output acoustic network; and identifying stop nodes in the acoustic network.

Thus, during a forward pass of a search, forward stop nodes are detected, signaling the search to stop forward scoring along a path currently being followed, and during a backward pass of the search backward stop nodes are detected, signaling the search to stop backward scoring along a path currently being followed. Then, for example, right-most semantically null networks are not computed, and some semantically salient words are not backward-scored. Thus an N-best list of only salient words is re-scored instead of a true N-best list.

Advantageously, scoring comprises Viterbi scoring or other known methods. The method above may be combined with other techniques to save processing time. For example, searching may alternatively be based on beam searches and lexical trees to provide benefits of those methods in addition to benefits of the method above.

According to another aspect of the invention there is provided software on a machine readable medium for performing a method of continuous speech recognition comprising: incorporating semantic information during searching by a continuous speech recognizer.

Preferably, the method comprises searching using semantic information to identify semantically null words and thereby generate a list of N-best salient words.

Yet another aspect of the invention provides software on a machine readable medium for performing a method for continuous speech recognition comprising: providing speech input to a continuous speech recognizer; providing to the continuous speech recognizer an acoustic model comprising a set of Hidden Markov Models, and a language model comprising both grammar and semantic information;

performing recognition of speech input using semantic information to eliminate semantically null words from the N-best list of words and restrict searching to an N-best list of salient words.

Another aspect of the invention provides a system for continuous speech recognition comprising:

means for incorporating semantic information during searching by a continuous speech recognizer; input means for providing speech input to the continuous speech recognizer; means for providing to the continuous speech recognizer an acoustic model comprising a set of Hidden Markov Models, and a language model comprising both grammar and semantic information; the continuous speech recognizer comprises means for performing recognition of speech input using the semantic information for eliminating semantically null words from the N-best list of words and thereby restricting searching to an N-best list of salient words, and performing word matching to output the N-best salient word sequences.

According to a further aspect of the present invention there is provided a spoken language processing system for speech recognition comprising: a continuous speech recognition component (CSR); a natural language understanding component (NLU); means for providing speech input to the CSR; means for providing acoustic-phonetic knowledge to the CSR comprising a set of Hidden Markov Models; means for providing language knowledge comprising grammar and statistical models to the CSR, and means for providing semantic knowledge the NLU, and means for providing semantic knowledge to the CSR; the CSR being operable for searching using the semantic knowledge to constrain the search to an N-best list of salient words, and perform word matching to output N-best list of salient words to the NLU for interpretation of meaning.

Another aspect of the present invention provides a method for continuous speech recognition using a spoken language system comprising a continuous speech recognition component (CSR) linked to a natural language understanding component (NLU); providing speech input to the CSR; providing acoustic-phonetic knowledge to the CSR comprising a set of Hidden Markov Models; providing language knowledge comprising grammar and statistical models to the CSR; providing language knowledge semantic knowledge to the CSR; performing searching with the CSR using the semantic knowledge to constrain the search to an N-best list of salient words comprising semantically meaningful words of the N-best list of words; and, performing word matching to output the N-best salient word sequences to the NLU.

The method and system described above may be combined with other techniques to save processing time. For example, searching may alternatively be based on beam searches and lexical trees to provide benefits of those methods in addition to benefits of the method described above.

Thus systems and methods are provided which allow considerable savings in computation time, so that more complex speech applications may be implemented on smaller and older platforms. Thus existing products with older processors may advantageously be upgraded to provide extended services. In newer products and processors, the number of simultaneous channels that can be supported is higher, reducing the cost of deploying services. Improved performance may enhance users perception of value and quality of service.

BRIEF DESCRIPTION OF THE DRAWINGS

The invention will now be described in greater detail with reference to the attached drawings wherein.

DETAILED DESCRIPTION OF THE EMBODIMENTS

Figure 1:
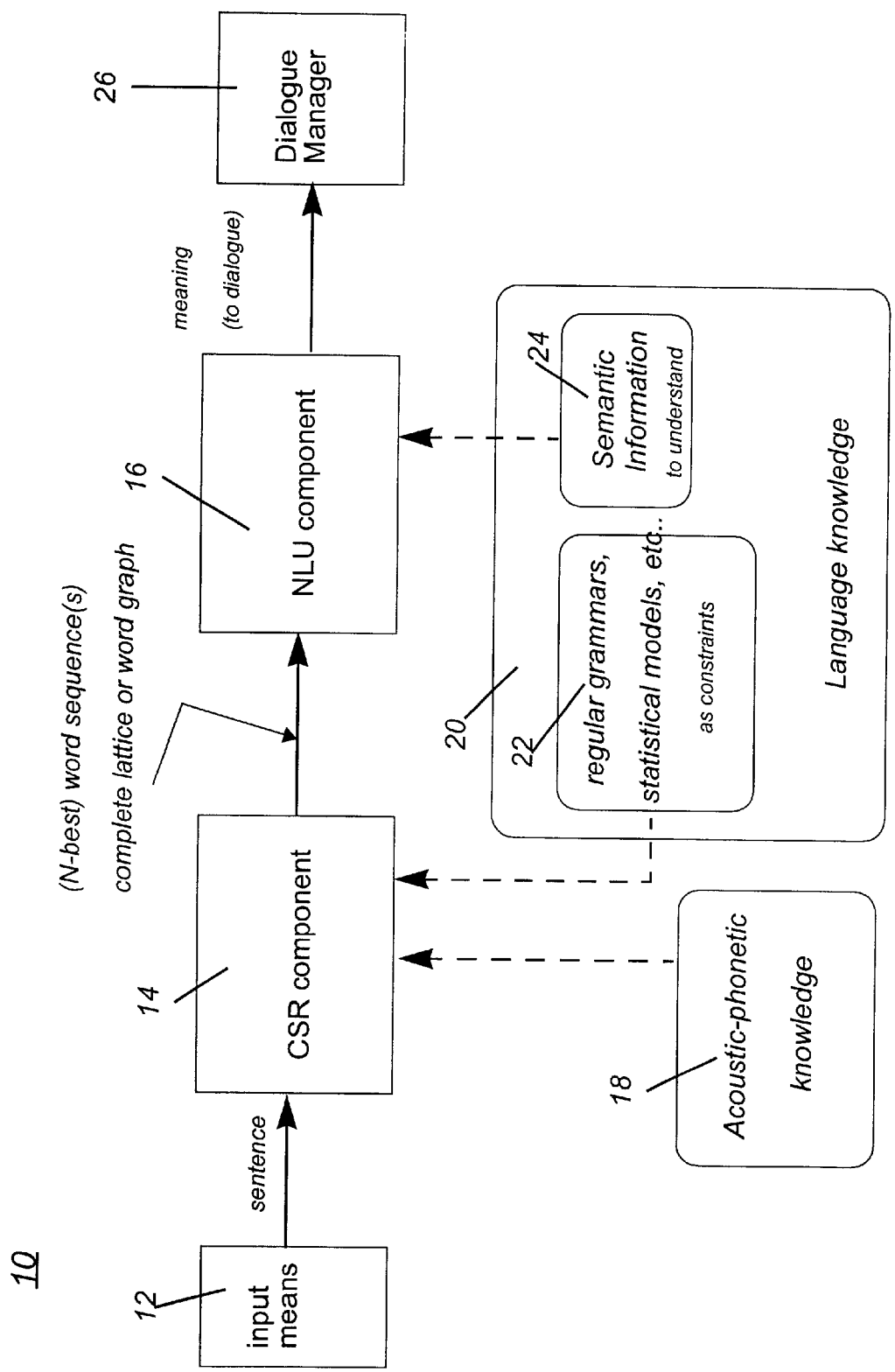
FIG. 1 shows a known prior art spoken language processing system comprising a continuous speech recognition component (CSR) and a natural language understanding component (NLU)

A conventional known spoken language processing system 10 for continuous speech recognition is represented by the schematic diagram shown in FIG. 1, which comprises an input means 12 for receiving a spoken input, a CSR component 14 for performing a search and word match outputting an N-best word sequence to an NLU component 16, providing an output to a dialogue manager 26. Acoustic phonetic information in the form of an acoustic model represented by element 18 which is fed to the CSR, and language knowledge represented by element 20, part of which comprising grammar and statistical information 22 is fed to the CSR component 14, in a conventional manner, typically to constrain the search space of the recognizer. Another part of the language knowledge comprises semantic information 24, which is fed to the NLU component 16. Thus language knowledge 20 comprises separate parts for use by separate components of the systems: the grammar and statistical information 22 used by the CSR, and the semantic information 24 used by the NLU.

Figure 2:
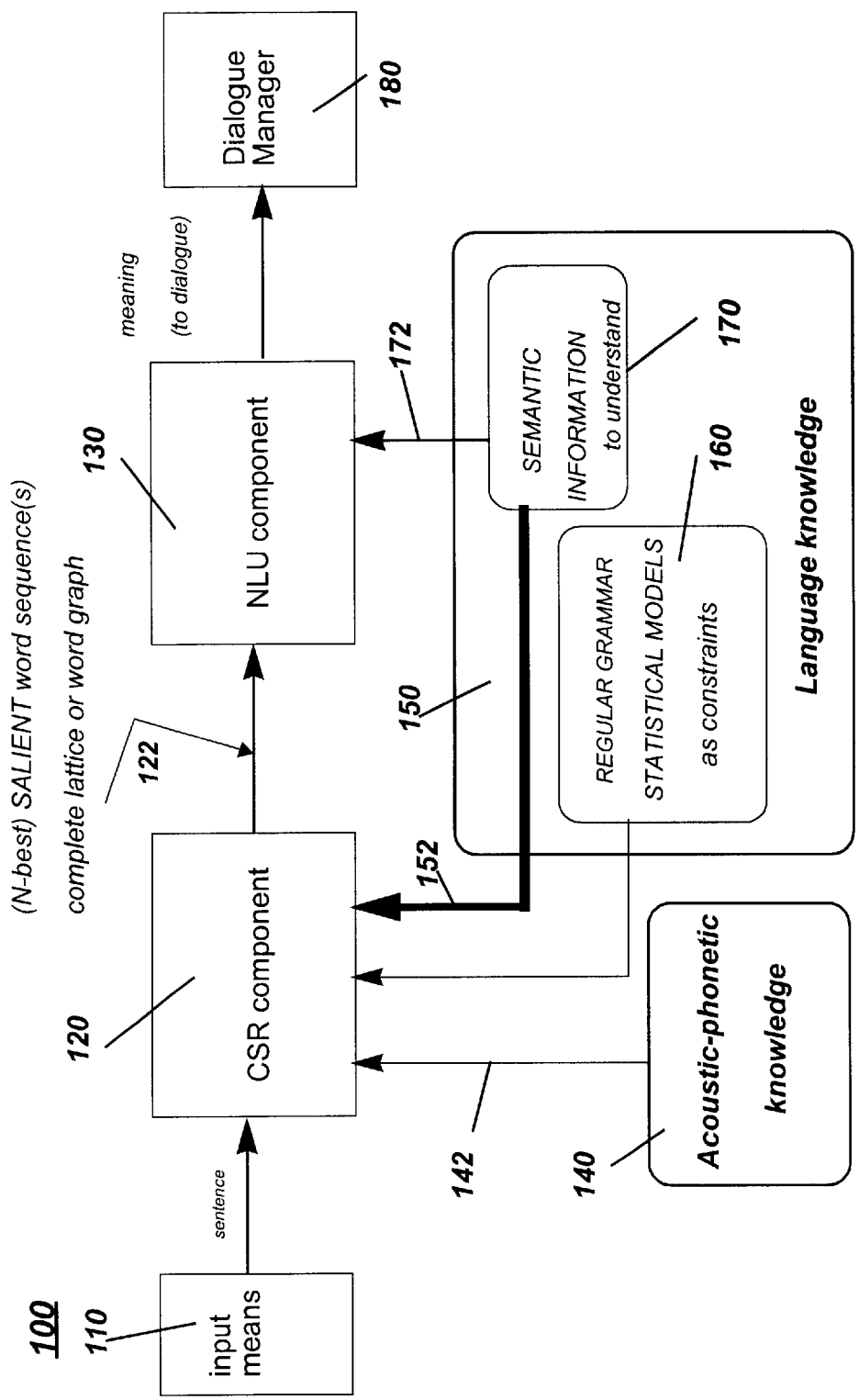
FIG. 2 shows a spoken language processing system comprising a continuous speech recognizer for search optimization according to a first embodiment of the present invention.

A system and method for continuous speech recognition according to a first embodiment of the present invention is described with reference to FIGS. 2 representing schematically a spoken language system 100 comprising a CSR 120 and an NLU component 130. Input means 110 receives a spoken input in the form of a sentence which is passed to the CSR 120. Acoustic phonetic information in the form of an acoustic model represented by element 140, and language knowledge 150 comprising grammar and statistical information 160 are fed to the CSR 120 in a conventional manner, typically to constrain the search space of the recognizer. The system 100 is distinguished from known systems, such as that exemplified in FIG. 1, in that the language knowledge 150 comprising semantic information 170 is fed not only to the NLU 130, in a conventional manner, but also to the CSR 120. The linkage 152 between the semantic information 170 and the CSR component 120 is represented by a heavy arrow. Thus when speech input in the form of a speech utterance comprising a series of words or sentence is received by the CSR, a search is performed. The acoustic phonetic knowledge 140 is provided, as is conventional, in the form of Hidden Markov Models (HMM) describing the acoustic space. In addition, the search is optimized to take advantage of available semantic information 170.

In the following description, the following simplifying assumptions are made for the sake of clarity:

Each word in the vocabulary has its dedicated acoustic network;

The search network branches all have zero weight.

These simplifying assumptions do not in any way reflect limitations of the proposed optimization and are merely made for the sake of clarity.

The optimized CSR search is based on a known four-pass process as follows:

The first two passes, known as the fast match, prune the search space into a compact representation of a limited number of sentence hypothesis known as a word graph. The last two passes, known as rescoring, perform a more detailed search of the word graph produced by the fast match to output the most likely word hypothesis.

The fast match search occurs in two passes. During the first pass, forward scores are computed for each word-ending node of the search graph. These forward scores measure, for each word in the graph, the likelihood of the best path which starts at time 0 and ends at the last node of w just before time t. During the forward pass, the path information is not preserved. The task of the backward pass is to recover this path information by backtracking through the most likely word hypothesis. In doing so, the backward pass is able to construct a word graph to be used later during the rescoring phase.

Figure 3:
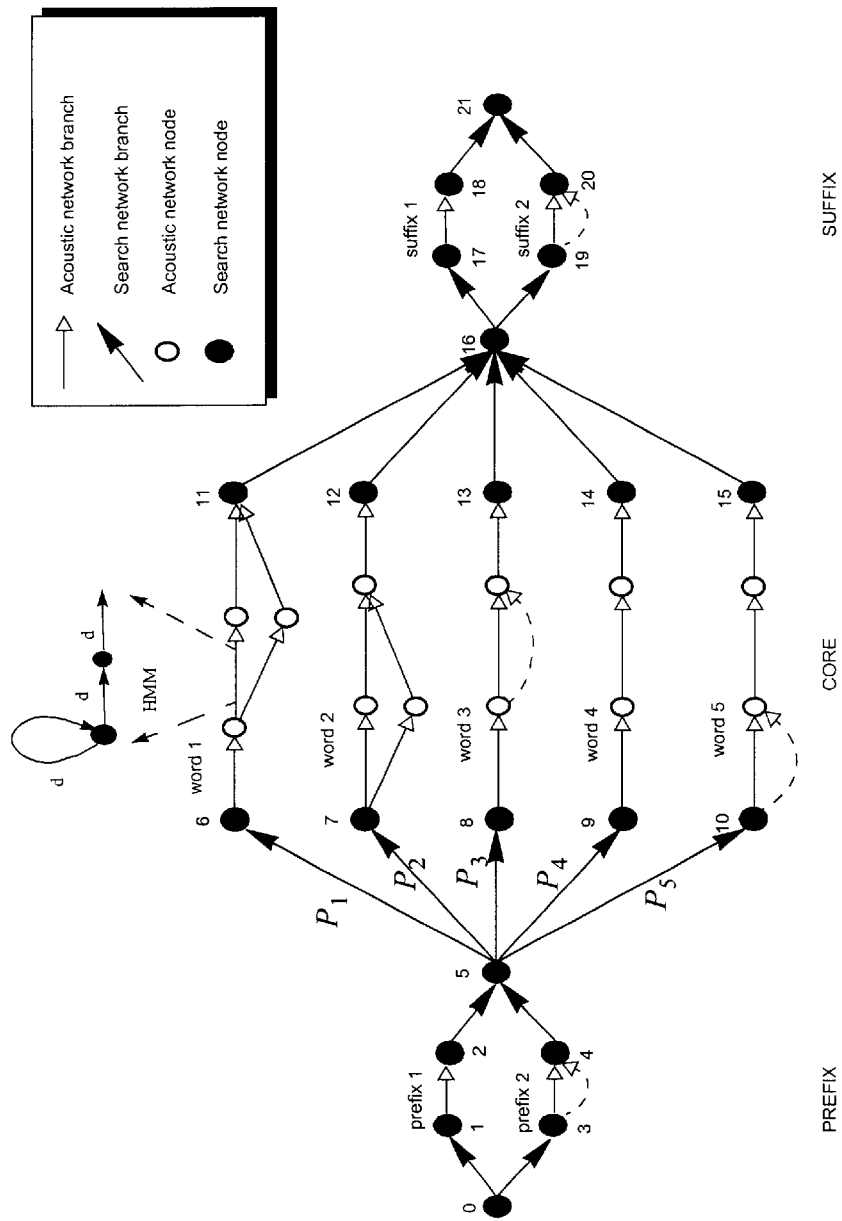
FIG. 3 shows an example of a search network for a prefix-core-suffix regular grammar.

FIG. 3 shows an example of a search network for a simple prefix-core-suffix type of regular grammar. The search network consists of a collection of network nodes and branches. These are depicted in FIG. 3 as solid circles and arrows, respectively. The hollow arrows and circles represent the acoustic networks for the words to be recognized. Each of the branches on an acoustic network is in fact an HMM, with its own collection of branches and nodes. Dashed arrows represent null branches in the acoustic network. In this example, the vocabulary consists of two prefix words, five core words and two suffix words.

Forward Pass

Figure 4:
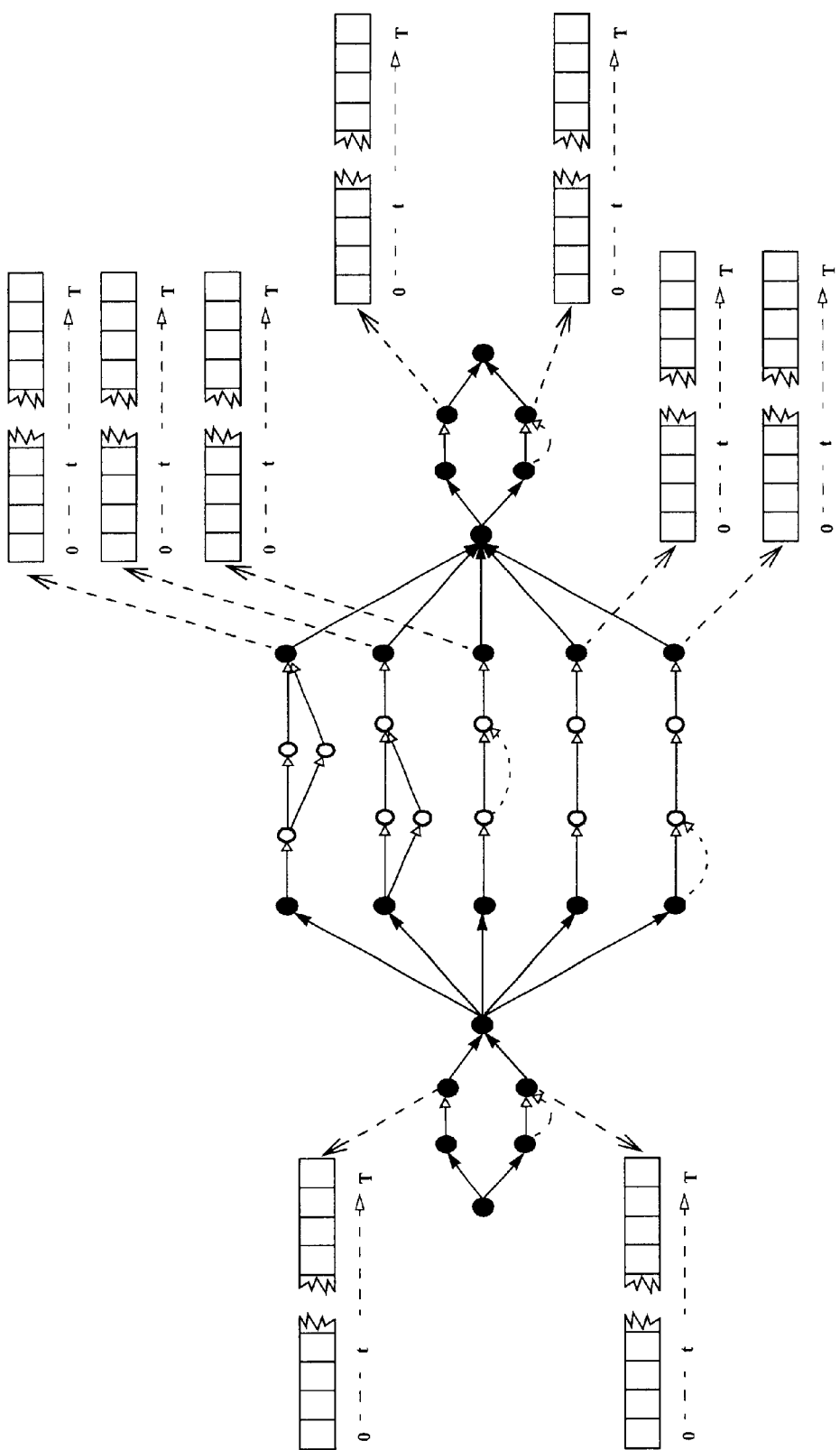
FIG. 4 represents forward scoring of the search network.

During the forward pass of the fast match, score vectors containing the likelihood of the best path starting at time 0 and ending in the last state of each word w, for all times t are computed. This process is depicted in FIG. 4. The arrow below the score vector indicates that this is a forward score vector.

Backward Pass

During the forward pass, path information is not saved. The purpose of the backward pass is to recover this path information for the N-best choices required. It uses a priority queue to keep track of the partial choices that are being extended.

The starting point of the backward pass is the last (rightmost) network node of the search network. A backward initial score buffer is initialized to the values (−∞, . . . 0) The operation is in the log-probability domain, so −∞ refers to the most unlikely event and 0 refers to the most likely event. The value at time T is initialized to 0 because it is known for sure that the utterance must end at time T.

The rest of the backward pass algorithm is as follows (each step is described below):

pull the next entry from the priority queue extend the word for this entry by back-scoring its acoustic network with the Viterbi algorithm find all word-ending nodes connected to the word-starting node of the extended word for all these word-ending nodes, meet the forward score vector with the backward score vector to determine the best meeting time.

return to step 1 until the queue is empty or the number of N of desired choices has been reached.

This algorithm treats each word with equal salience, that is, each word is considered important in determining the meaning of the utterance.

Figure 5:
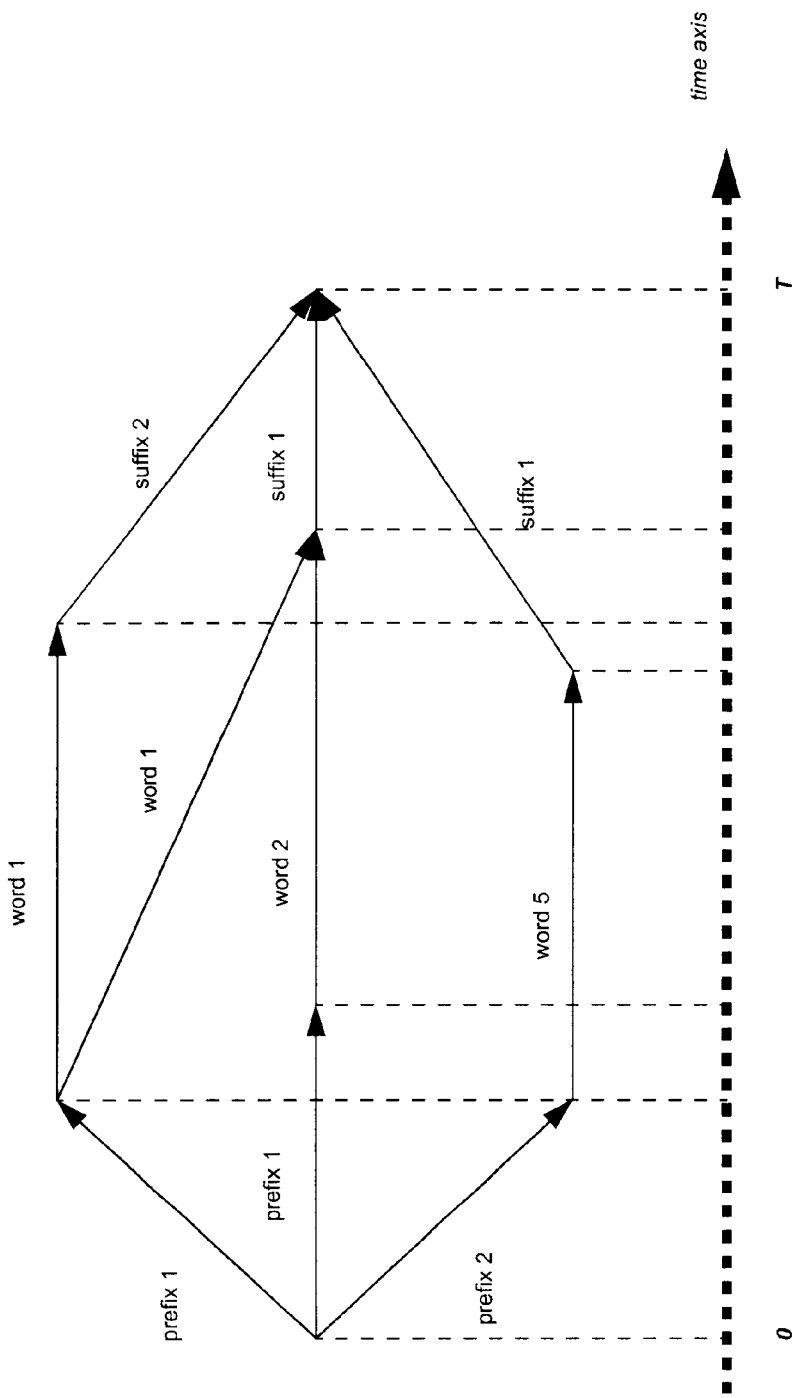
FIG. 5 shows an example of a word graph using a backward pass using a known search optimization process.

In practice, some words are more salient than others. Consider the prefix-core-suffix grammar depicted in FIG. 3. This grammar essentially acts as a (limited) word spotter, where each word in the core list may be preceded by any prefix word, and succeeded by any suffix word. In this particular case, which affix is actually used, is completely irrelevant to determine the meaning of the utterance: only the core entry is needed. Yet the word lattice produced by the backward pass described in above will give a detailed segmentation of each N-best choice, which may look something like FIG. 5.

On the other hand, when the fact that the affixes are semantically null is used, that is, they bring nothing to the meaning of the utterance, substantial savings may be achieved.

The key to those savings is that instead of producing an N-best list of complete choices, we produce an N-best list consisting of only non-semantically-null words, i.e. an N-best list of salient words. In our prefix-core-suffix example, this would be a list of only core entries. To achieve this, the search network is modified in at least two respects, which are described below. The optimizations work together to reduce search time.

Collapsing of Acoustic Networks for Semantically Null Words

All semantically null words which originate (directly or indirectly) from the same search network node and which merge (indirectly) to the same node are collapsed into a unique single-input single-output acoustic network. As an example, refer to FIG. 3. All prefix words originate indirectly from node 0 and merge indirectly at node 5, so these words may be collapsed into a single acoustic network with a single input and a single output. Similarly, the suffix words may be collapsed into a single acoustic network, since they all originate from node 16 and merge at node 21.

Figure 6:
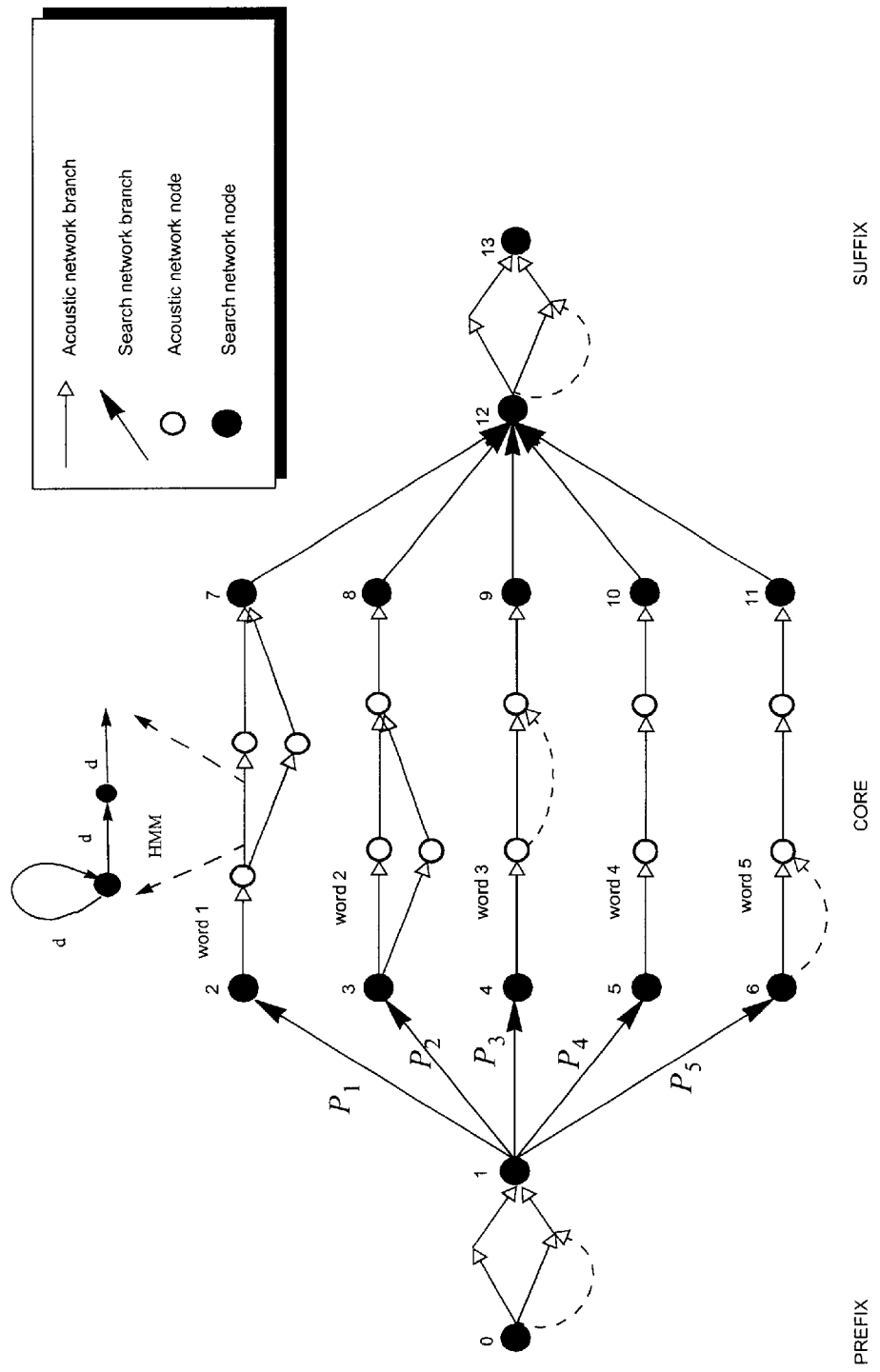
FIG. 6 shows the search network of FIG. 3 after collapsing of the affixes.

The reason for this collapsing is two-fold. First, because the acoustic network has a single input and a single output, greater graph compression may be achieved since the phonetic similarities of the words may be exploited from both ends. Second, the output score vector resulting from the backtracking of the collapsed acoustic network will yield the scores of the best paths (for all times) through that network, regardless of which word was traversed. FIG. 6 shows the search network of FIG. 3 when the affixes are collapsed, with the new node labeling.

Stop Nodes

The lion's share of the savings resulting from the proposed optimizations are due to the presence of stop nodes in the search network. A stop node is a special type of network node that signals the search algorithm to stop the Viterbi scoring along the path it is currently following. There are two types of stop nodes: forward and backward. The forward stop nodes are used during the forward pass of the search and signal the search to stop the forward scoring. Similarly the backward stop nodes signal the search to stop the backward scoring.

The position of these stop nodes is uniquely determined by the layout of the search network and the position of the collapsed networks (hence the semantically null words). The forward stop nodes are located at the end nodes of the right-most (i.e. closest to the network's end node) set of non-semantically-null words (i.e. semantically meaningful words) that are connected to a semantically null acoustic network. The backward stop nodes are located at the end nodes of the left-most (i.e. closest to the network's start node) set of non-semantically-null words that are connected to a semantically null acoustic network.

In summary, the search network of FIG. 6 may be used to locate stop nodes, starting with the forward stop nodes. In this case, the right-most set of non-semantically-null words happen to be the core words, because they are connected to the suffix (a collapsed acoustic network) and no other salient words occur past the suffix. So nodes 7, 8, 9, 10 and 11 are all forward stop nodes. The core is also the left-most set of non-semantically-null words, since it is connected to the prefix (a collapsed network) and no other salient words occur before the suffix. So in this case, the same nodes, 7, 8, 9, 10 and 11, are also backward stop nodes.

With the semantically null words collapsed and stop nodes in place, search benefits from these alterations to the network will be described. Throughout this section, without loss in generality, the prefix-core-suffix network of FIG. 6 is used as an example.

The first savings occur during the forward pass, when the prefix network is traversed. Because all words of the prefix were collapsed into a unique single-input single-output network, the resulting number of acoustic network branches is potentially much smaller. Note, however, that even without the proposed optimizations, it would have been possible to collapse the search network from the entry point, thus generating a tree instead of a graph. So the actual savings are the reduction in branches from a tree to a single-input single-output graph, which may or may not be significant, depending on the size of the prefix.

The forward pass then continues by generating the forward score vectors for nodes 1 through 11. However, the forward processing stops there, since nodes 7 through 11 are forward stop nodes. This means that the score vector "max-out" at node 12 will not take place, and neither will the scoring of the suffix network. At this point, the forward pass is completed.

The backward pass then takes over by first reverse-scoring the collapsed suffix acoustic network. Because the suffix network was collapsed, scoring all suffix words occurs simultaneously. The backward pass described above actually scores words on a "need-to" basis. The backward pass extends paths with the highest total likelihood first. Hence alternate suffix words will be scored only if they belong to a path with a high total likelihood. So the backward scoring of the suffix network may end-up being more costly than individual scoring of suffix words on a "need-to" basis.

After back-scoring the suffix, the backward pass meets the reverse suffix score vector with the forward score vectors of nodes 7 through 11. Conventionally, the word that yields the best total likelihood would be chosen for backward scoring. But because this node is a backward stop node, the backward scoring does not take place. Instead, the word is still backtracked, but only to construct the re-score graph properly. Depending on the layout of the search network, this saving can be considerable. Note that most of the time spent during the backward pass is for back-scoring networks.

Impact on Re-scoring

The re-scoring algorithm is very similar to the fast match algorithm previously described. It contains a forward pass to compute the forward score vectors at each word-ending node and a backward pass to decode the list of choices, just as described above. The most notable differences with the fast match pass are that in re-scoring:

the network does not contain any loops, so a block algorithm may be used;

the whole utterance is available, so the block may be set to the entire utterance;

no pruning is done, since it is assumed that the fast match has already done the necessary pruning.

Given these strong parallels with the least match steps, it is easy to see that all the optimization previously described may be applied to the re-scoring algorithm as well.

Figure 7:
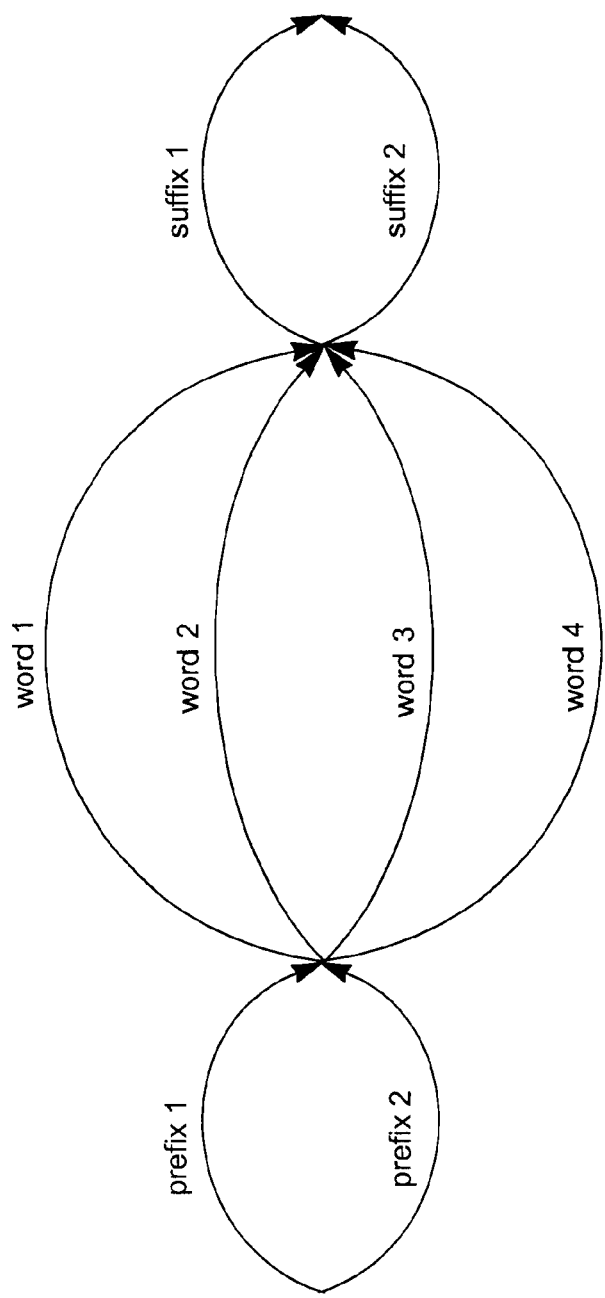
FIG. 7 shows a re-score graph generated during the optimized backward pass.

Furthermore, additional savings are made possible since the re-scoring graph is a compact representation of N-best list of non-semantically-null word sequences, instead of the true N-best list. Hence, the re-scoring algorithm is forced to focus only on the meaningful choice alternatives, leaving aside the non-informative affixes. FIG. 7 shows the optimized re-score graph.

Care must be taken, however, when designing the grammar. If the list of semantically null words is large, then re-scoring time will be adversely affected, since all these words need to be re-scored (remember there is no pruning in re-scoring). If that is the case, then it may be more efficient to revert to the true N-best search.

Another point to mention is that constrained window Viterbi scoring can only be used to a limited extent with the proposed optimizations. Constrained window Viterbi scoring occurs when scoring is constrained to a fixed time window determined (approximately) by the word segmentation provided by the fast match pass. Since not all word segmentations are produced with the optimized backward pass of the fast match, the re-scoring algorithm may be forced to score some words over a larder window than it should. The extent to which this is a problem is highly dependent on the mean word durations of non-semantically-null words with respect to semantically null words. In other words, the shorter the semantically null words are with respect to the non-semantically-null words, the smaller the penalty.

As mentioned before, re-scoring is more efficient since we re-score only the list of N-best non-semantically-null words sequences, instead of re-scoring, the true N-best list. To understand why this is so, refer to FIG. 5, which shows a word graph representing the true N-best list. Consider the word labeled "word 1" in the graph. Because this word is connected to two different suffixes, at different times ("suffix 1" and "suffix 2"), it will have to be scored twice.

Conclusion

A reduction in the amount of computations required to perform the search in continuous speech recognition is achieved by incorporating semantic information into the recognizer. Search optimizations involve collapsing each list of semantically null words into a unique single-input single-output acoustic network, and identifying stop nodes in the acoustic network.

These optimizations translate into savings in the processing required for the search because:

forward semantically null networks are collapsed into a graph.

right-most semantically null networks are not computed.

some non-semantically-null words are not backward-scored.

an N-best list of only salient words is re-scored instead of a true N-best list.

As a result, time savings during both forward and backward passes of the search, as well as during re-scoring, are achieved by performing only the minimal amount of computations required to produce an exact N best list of only semantically meaningful words, which is referred to as the N-best list of salient words.

The benefits are achieved by allowing semantically null meaning to be used by the recognizer component.

Time synchronous processing time, occurring while the utterance is being spoken, is reduced by computing only a subset of the search space. The amount of delay after a person finished speaking before the recognized word string is returned by the application is reduced. By performing only the necessary computation required to produce a top-N list of semantically meaningful words, the processing time for the backward pass of the search is reduced, by up to a factor of ten in some cases.

The post processing delay is also reduced during, the re-scoring, pass since a more compact list of choices needs to be re-scored.

Thus a single generic continuous speech recognizer may be used for all types of tasks, including those that may be optimized by incorporating semantic information at the recognizer level.

These processing time savings make it possible to run an increased number of speech recognition channels in parallel. This advantage is paramount for cost-effective real-time applications such as, for example, Nortel's Personal Voice Dialer (PVD) and Voice Activated Business Directory (VABD) and Automated Directory Assistance Service Plus (ADAS+).

This development allows more complex speech applications to be implemented on smaller and older platforms. Thus existing products with older processors may advantageously be upgraded to provide extended services. In newer products and processors, the number of simultaneous channels that can be supported is higher, reducing the cost of deploying services. Improved performance may enhance users perception of value and quality of service.

The method and system described above may be combined with other techniques to save processing time. For example, searching may alternatively be based on beam searches and lexical trees to provide benefits of those methods in addition to benefits of the method described above.

Although specific embodiments of the invention have been described in detail, it will be that numerous variations and modifications to the embodiments may be made within the scope of the following claims.

What is claimed is:

1. A method for continuous speech recognition, comprising:
   receiving an input signal derived from a spoken utterance of a set of words;
   providing a search network indicative of a plurality of recognizable words, the search network comprising a plurality of interconnected words, a given interconnection being established at least in part based on a connected word grammar,
   providing semantic information;
   detecting in the search network connected word grammars bounded by semantically null words;
   generating a modified search network by performing a process comprising:
      collapsing each list of semantically null words into a unique single-input single-output search network portion, and
      identifying stop nodes in the search network, the modified search network being indicative of a plurality of non-semantically-null words; and
   processing the input signal at least in part based on the modified search network to derive a list of N-best salient words that potentially match at least one word of the spoken utterance.

2. The method of claim 1, wherein the stop nodes comprise forward stop nodes and backward stop nodes.

3. The method of claim 2, wherein the step of processing the input signal comprises a search characterized by a forward pass and a backward pass, wherein the method further comprises the steps of:
   during the forward pass of the search, detecting forward stop nodes in the modified search network and signaling the search to stop forward scoring along a path currently being followed; and
   during the backward pass of the search, detecting backward stop nodes in the modified search network and signaling the search to stop backward scoring along a path currently being followed.

4. The method of claim 3, wherein scoring comprises Viterbi scoring.

5. Software on a machine readable medium for performing a method for continuous speech recognition, the method comprising the steps of:
   providing an input signal derived from a spoken utterance of a set of words;
   providing a search network indicative of a plurality of recognizable words, the search network comprising a plurality of interconnected words, a given interconnection being established at least in part based on a connected word grammar,
   providing semantic information;
   detecting in the search network connected word grammars bounded by semantically null words;
   generating a modified search network by performing a process comprising:
      collapsing each list of semantically null words into a unique single-input single-output search network portion, and
      identifying stop nodes in the search network, the modified search network being indicative of a plurality of non-semantically-null words; and
   processing the input signal at least in part based on the modified search network to derive a list of N-best salient words that potentially match at least one word of the spoken utterance.

6. A system for continuous speech recognition, comprising:
   an input for receiving an input signal derived from a spoken utterance of a set of words;
   means for providing a search network indicative of a plurality of recognizable words, the search network comprising a plurality of interconnected words, a given interconnection being established at least in part based on a connected word grammar,
   means for providing, semantic information;
   means for detecting in the search network connected word grammars bounded by semantically null words;
   means for generating a modified search network by performing a process comprising:
      collapsing each list of semantically null words into a unique single-input single-output search network portion, and identifying stop nodes in the search network, the modified search network being indicative of a plurality of non-semantically-null words; and means for processing the input signal at least in pair based on the modified search network to derive a list of N-best salient words that potentially match at least one word of the spoken utterance.

7. The system of claim 6, wherein the stop nodes include forward stop nodes and backward stop nodes.

8. The system of claim 7, wherein the means for processing the input signal is operative for implementing a search characterized by a forward pass and a backward pass;

during the forward pass of the search, the second processing means being operative for detecting forward stop nodes in the modified search network and signaling the search to stop forward scoring along a path currently being followed; and during the backward pass of the search, the second processing means being operative for detecting backward stop nodes in the modified search network and signaling the search to stop backward scoring along a path currently being followed.

9. The system of claim 8, wherein scoring comprises Viterbi scoring.

\* \* \* \* \*